(12) United States Patent
Bassan et al.

(10) Patent No.: US 10,821,495 B2
(45) Date of Patent: Nov. 3, 2020

(54) METHOD FOR PRODUCING COMPONENTS FOR MOTOR-VEHICLE STRUCTURES, HAVING A HYBRID STRUCTURE MADE OF LIGHT ALLOY AND PLASTIC MATERIAL

(71) Applicant: C.R.F. Societa Consortile per Azioni, Orbassano (IT)

(72) Inventors: Daniele Bassan, Orbassano (IT); Marco Colosseo, Orbassano (IT)

(73) Assignee: C.R.F. Società Consortile per Azioni, Orbassano (IT)

( * ) Notice: Subject to any disclaimer, the term of this patent is extended or adjusted under 35 U.S.C. 154(b) by 550 days.

(21) Appl. No.: 15/635,257

(22) Filed: Jun. 28, 2017

(65) Prior Publication Data
US 2018/0009019 A1 Jan. 11, 2018

(30) Foreign Application Priority Data
Jul. 6, 2016 (EP) .................................... 16178085

(51) Int. Cl.
*B21D 26/021* (2011.01)
*B32B 15/20* (2006.01)
(Continued)

(52) U.S. Cl.
CPC ......... *B21D 26/021* (2013.01); *B21D 26/059* (2013.01); *B21D 53/88* (2013.01);
(Continued)

(58) Field of Classification Search
CPC ..... B21D 26/021; B21D 26/059; B21D 53/88
(Continued)

(56) References Cited

U.S. PATENT DOCUMENTS 3,352,742 A 11/1967 Alexander et al.
3,455,775 A 7/1969 Pohl et al.
(Continued)

FOREIGN PATENT DOCUMENTS

CA 2151786 A1 1/1996
DE 102013110282 A1 3/2015
(Continued)

OTHER PUBLICATIONS

European Search Report for European Application No. 16178085.3 dated Nov. 28, 2016, 4 pages.

*Primary Examiner* — Adam J Eiseman
*Assistant Examiner* — Bobby Yeonjin Kim
(74) *Attorney, Agent, or Firm* — RMCK Law Group, PLC

(57) ABSTRACT

A component of a vehicle structure is obtained by a hot forming operation on a hybrid panel having a sheet element of light alloy and a sheet of plastic material. The hybrid panel is hot formed by pressing it against a forming surface of a mould element by a pressurized gas or by a second mould element. Following this operation, the hybrid panel assumes a configuration corresponding to the forming surface, whereas the light alloy sheet element and the plastic material sheet constituting the hybrid panel adhere to each other following softening by heat of the plastic material. Before the hot forming step, a surface of said light alloy sheet element which must contact the plastic material sheet is subjected to a roughening treatment, thereby defining surface asperities between which the plastic material of the plastic material sheet is inserted when it is softened by heat.

14 Claims, 5 Drawing Sheets

Figure 1A:
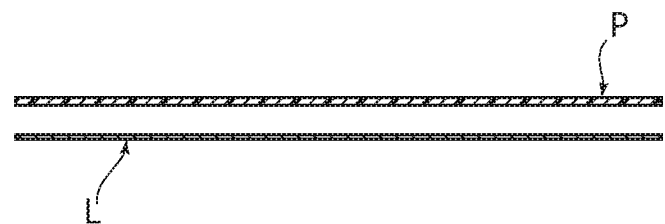

(51) Int. Cl.
| | |
|---|---|
| *B32B 15/085* | (2006.01) |
| *B32B 27/32* | (2006.01) |
| *B32B 7/04* | (2019.01) |
| *B32B 27/34* | (2006.01) |
| *B32B 15/088* | (2006.01) |
| *B32B 15/08* | (2006.01) |
| *B21D 26/059* | (2011.01) |
| *B21D 53/88* | (2006.01) |
| *B32B 15/14* | (2006.01) |
| *B29K 307/04* | (2006.01) |
| *B29K 309/08* | (2006.01) |
| *B29K 623/00* | (2006.01) |
| *B29K 677/00* | (2006.01) |
| *B29K 705/00* | (2006.01) |
| *B29L 31/30* | (2006.01) |

(52) U.S. Cl.
CPC ............... *B32B 7/04* (2013.01); *B32B 15/08* (2013.01); *B32B 15/085* (2013.01); *B32B 15/088* (2013.01); *B32B 15/14* (2013.01); *B32B 15/20* (2013.01); *B32B 27/32* (2013.01); *B32B 27/34* (2013.01); *B29K 2307/04* (2013.01); *B29K 2309/08* (2013.01); *B29K 2623/12* (2013.01); *B29K 2677/00* (2013.01); *B29K 2705/00* (2013.01); *B29L 2031/3002* (2013.01); *B32B 2250/40* (2013.01); *B32B 2260/021* (2013.01); *B32B 2260/046* (2013.01); *B32B 2262/101* (2013.01); *B32B 2262/106* (2013.01); *B32B 2307/732* (2013.01); *B32B 2605/00* (2013.01); *B32B 2605/08* (2013.01)

(58) Field of Classification Search
USPC .......................................................... 72/363
See application file for complete search history.

(56) References Cited

U.S. PATENT DOCUMENTS

| | | | | |
|---|---|---|---|---|
| 3,838,506 | A * | 10/1974 | Karol ....................... | H05K 1/09 29/846 |
| 4,390,489 | A * | 6/1983 | Segal ...................... | B29B 11/04 264/126 |
| 4,657,717 | A * | 4/1987 | Cattanach ........... | B29C 43/3642 264/102 |
| 5,410,132 | A * | 4/1995 | Gregg .................. | B21D 26/055 219/604 |
| 6,202,276 | B1 * | 3/2001 | Chuang ................ | B21D 26/055 29/421.1 |
| 9,505,177 | B2 * | 11/2016 | Fujioka ............. | B29C 45/14221 |
| 9,511,404 | B1 * | 12/2016 | Huang ................. | B21D 26/029 |
| 2015/0231686 | A1 * | 8/2015 | Colosseo ............... | B21D 37/16 29/897.2 |

FOREIGN PATENT DOCUMENTS

| | | |
|---|---|---|
| EP | 0007639 A1 | 2/1980 |
| EP | 0598428 A1 | 5/1994 |
| EP | 0692371 A1 | 1/1996 |
| EP | 2647486 A1 | 10/2013 |

* cited by examiner

METHOD FOR PRODUCING COMPONENTS FOR MOTOR-VEHICLE STRUCTURES, HAVING A HYBRID STRUCTURE MADE OF LIGHT ALLOY AND PLASTIC MATERIAL

CROSS REFERENCE TO RELATED APPLICATIONS

This application claims priority to European Patent Application No. 16178085.3 filed on Jul. 6, 2016, the entire disclosure of which is incorporated herein by reference.

FIELD OF THE INVENTION

The present invention relates to the field of methods for manufacturing components of motor-vehicle structures by a hot pressing operation on at least one sheet element made of a light alloy, for example an aluminium alloy or a magnesium alloy.

In particular, the invention relates to a method comprising the steps of
- providing a hybrid panel adjacent to a mould element having a forming surface,
- wherein said hybrid panel comprises at least one sheet of plastic material in contact with at least one sheet element of light alloy substantially along the entire extension thereof,
- hot forming said hybrid panel in its entirety by pressing it against said forming surface of said mould element with a predetermined controlled pressure and by simultaneously applying heat, until the hybrid panel assumes a configuration corresponding to that of said forming surface,
- wherein preliminarily to the hot forming step of the hybrid panel, the surface of said sheet element of light alloy which is to come in contact with the sheet of plastic material is subjected to a roughening treatment, so as to define surface asperities.

A method of this type is known from EP 0 692 371 A1. A similar method is known from U.S. Pat. No. 4,657,717 A.

OBJECT OF THE INVENTION

The applicant started from the idea of conceiving a method of the above indicated type adapted for manufacturing components having a hybrid structure, constituted by walls defined by one or more elements of light alloy coupled with one or more elements of plastic material, in particular composite plastic material reinforced with fibres, such as carbon fibres or glass fibres.

The use of hybrid components of this type would provide the main advantage of satisfying the opposite needs of lightness and mechanical strength of the structure in the best possible manner, as well as the further advantage of reducing vibrations of the structure during travel of the motor-vehicle, with a resulting greater reliability and lower noise.

It is therefore a main object of the present invention that of providing components, in particular components of motor-vehicle structures, having a hybrid structure, with one or more walls constituted by one or more layers of light alloy sheets coupled with one or more layers of plastic material.

A further object of the present invention is that of providing a method of the above indicated type which is simple and inexpensive and nevertheless enables very light structures to be obtained, having a high degree of strength and reliable in use.

Also a further object of the invention is that of providing a method of the above indicated type which is very flexible in use i.e. which enables the structure of the component obtained thereby to be varied easily.

SUMMARY OF THE INVENTION

In view of achieving the above indicated object, the present invention provides a method of the type indicated at the beginning of the present description and further characterized in that:
- before said hot forming step said at least one sheet element of light alloy and said at least one sheet of plastic material are coupled with each other so as to be in contact substantially along their entire extension, in a loose condition, without any preliminary mutual connection, and
- in that said at least one sheet element of light alloy and said at least one sheet of plastic material constituting the hybrid panel are caused to adhere to each other as a result of a softening by heat of the sheet of plastic material during said hot forming step, with the plastic material of the sheet of plastic material which enters into said asperities when it is softened by heat during said hot forming step.

In a first embodiment, the forming step of the hybrid panel is carried out by pressing the hybrid panel against said forming surface of the first mould element by means of a fluid under pressure, preferably pressurized gas (such as nitrogen or argon).

In a second embodiment, the forming step of the hybrid panel is carried out by pressing the hybrid panel against said forming surface of the first mould element by a second mould element.

As already indicated in the foregoing, the light alloy may be an aluminium alloy or a magnesium alloy. The forming temperature may vary between 150° C. and 350° C., preferably between 150 C.° and 250° C., as a function of the features of the light alloy and the plastic material.

In the case of forming by pressurized gas, the supply pressure of the forming gas is comprised between 10 bars and 200 bars and the forming step is extended through a time not greater than a few minutes, preferably not greater than two minutes.

The plastic material is preferably a composite material with a matrix constituted by a plastic resin, such as polypropylene or polyamide, and reinforcing fibres, such as carbon fibres or glass fibres. Curing of the resin of the composite material is obtained during the hot forming step of the hybrid panel.

Preferably, the thickness of the layer of light alloy or of each layer of light alloy, is relatively reduced, such as ⅒ mm up to a maximum of 2 mm, for favouring formability also at non-high temperatures.

In a first example of the forming method with the aid of gas under pressure, the first mould element comprises a cavity defining said forming surface. The hybrid panel is applied on said first mould element so as to be in contact with lateral portions of said first mould element and overlying the cavity. In this condition a closing element is applied above the hybrid panel so as to press the peripheral portions of the hybrid panel against the lateral portions of the first mould element, thereby closing the top of the forming cavity. The above mentioned closing element has one passage from which gas under pressure is supplied, so as to push the hybrid panel against the surface of the cavity. In one variant, the first mould element defines a projecting forming surface and the hybrid panel is clamped along its periphery within a vertically movable frame which is lowered above said projecting surface. Between the movable frame and the hybrid panel clamped thereto a chamber is defined in which gas under pressure is supplied for pressing the hybrid panel against said forming surface when said vertically movable frame is lowered above the forming surface.

For forming the hybrid panel, a single sheet metal element and a single sheet of plastic material may be provided, arranged preferably with the sheet metal element in contact with the forming surface, so that on the opposite side the sheet of plastic material may also be provided with additional layers localized at portions of the panel which require to be strengthened.

A structure of this type may for example be made for forming a portion of a motor-vehicle floor panel, such as the portion containing the spare wheel, with the layer of sheet alloy arranged so as to face towards the ground (so as to protect the structure from the impact of foreign bodies).

It is possible to provide hybrid components having more than two layers, such as a single sheet of composite plastic material interposed between two layers of light alloy.

DESCRIPTION OF PREFERRED EMBODIMENTS

Figure 1B:
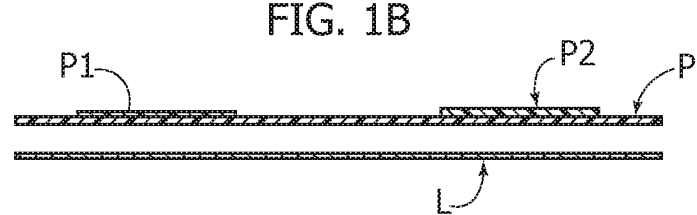
Figure 2A:
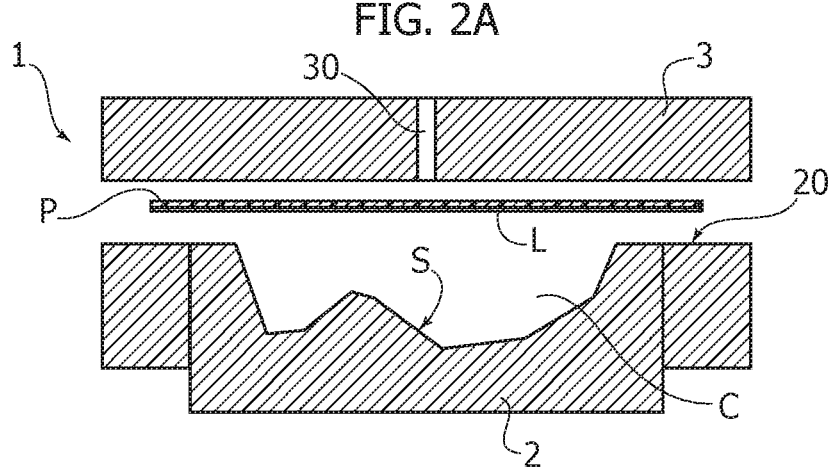
Figure 2B:
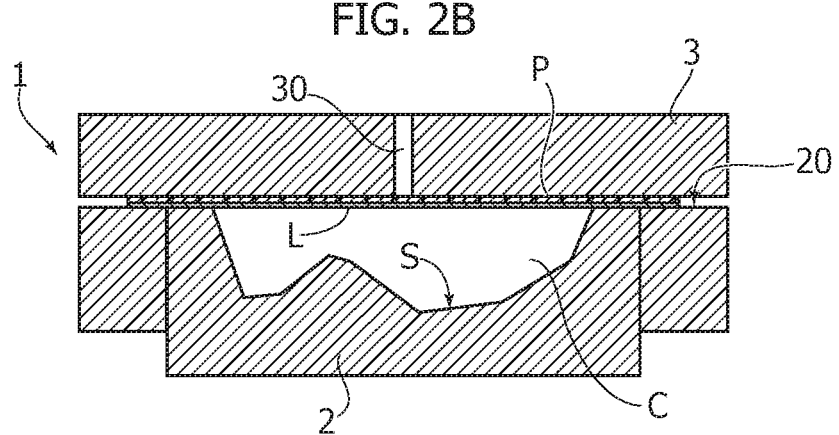
Figure 2C:
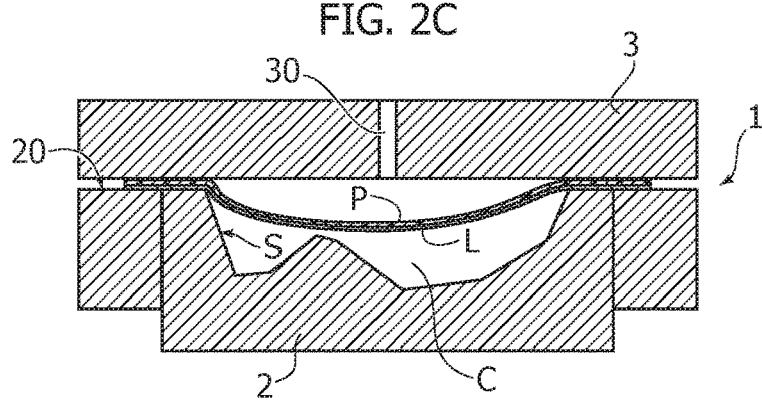
Figure 2D:
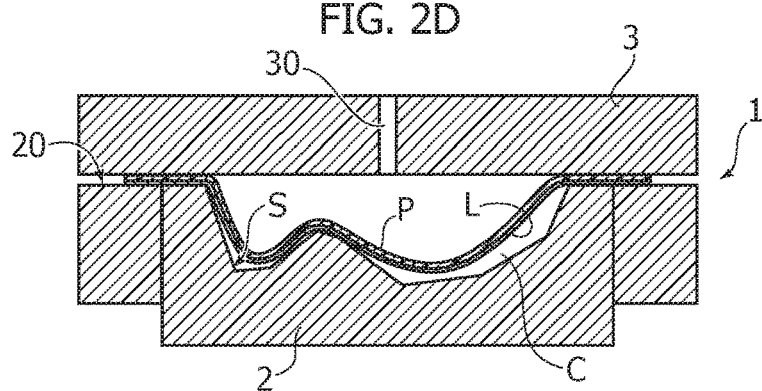
Figure 2E:
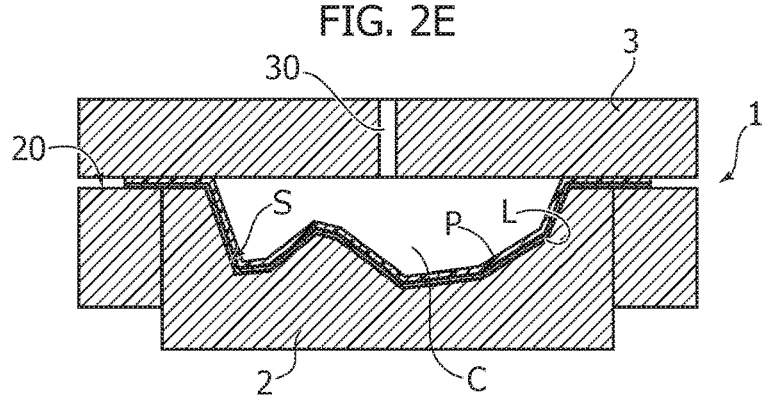
Figure 2F:
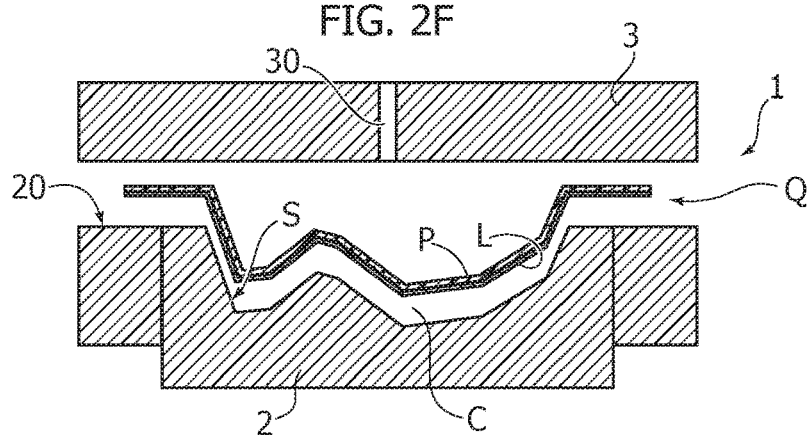
Figure 3:
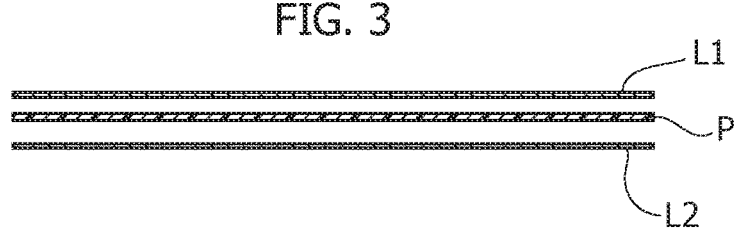
Figure 4A:
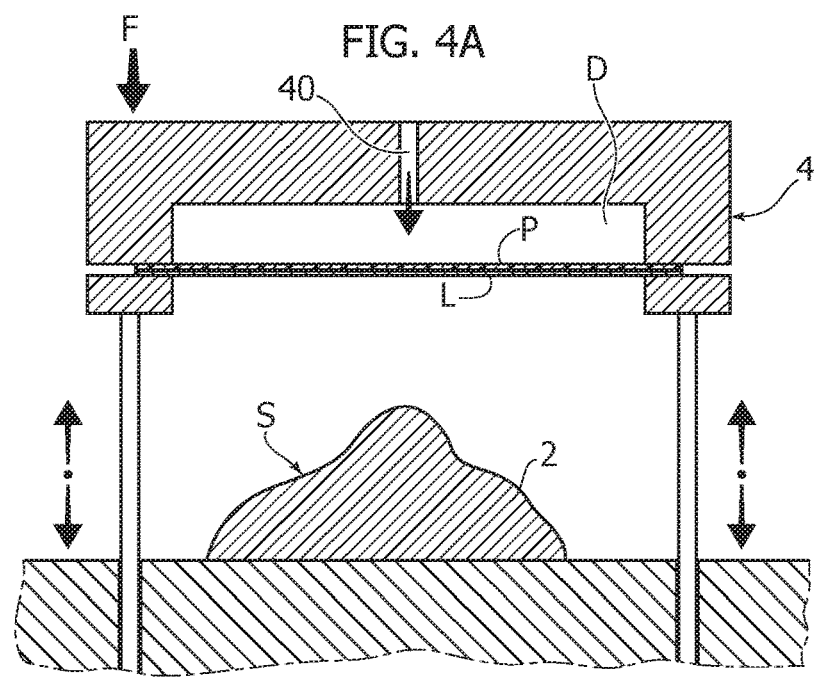
Figure 4B:
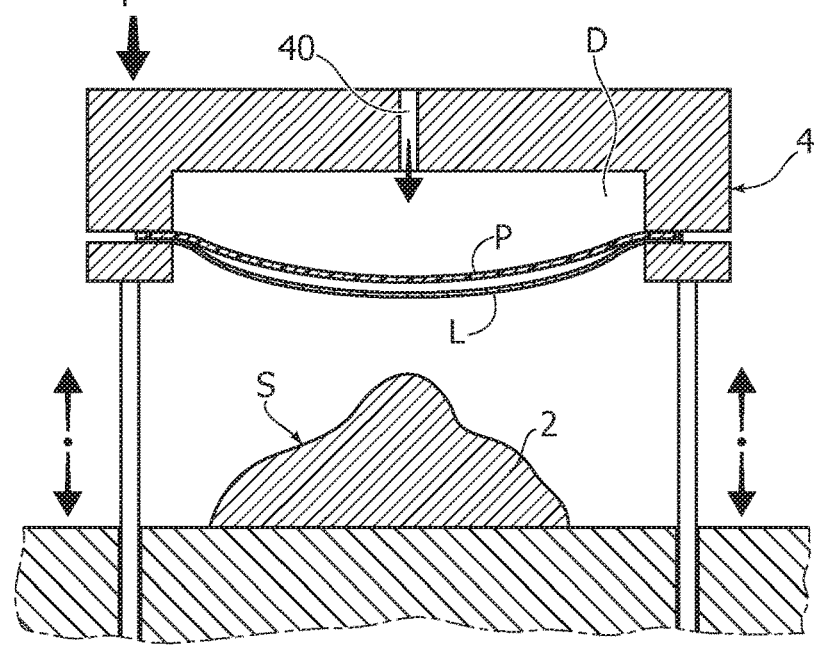
Figure 4C:
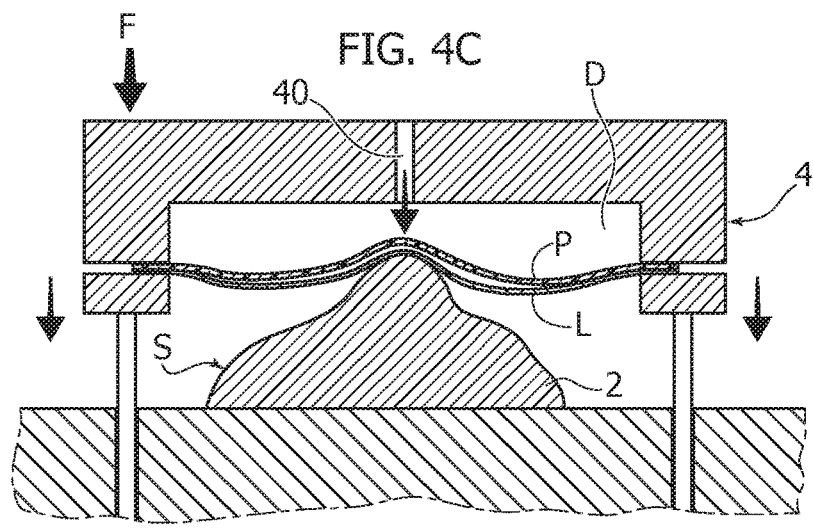
Figure 5A:
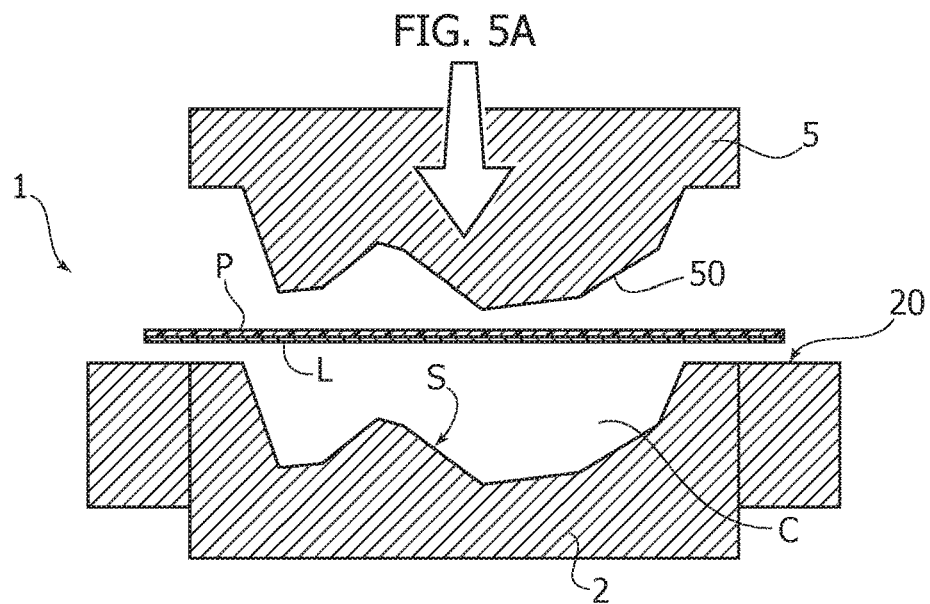
Figure 5B:
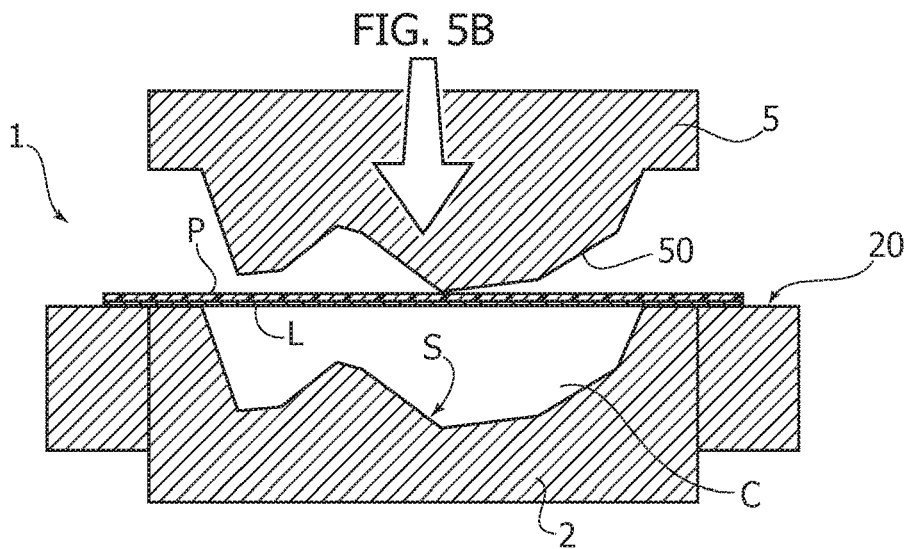
Figure 5C:
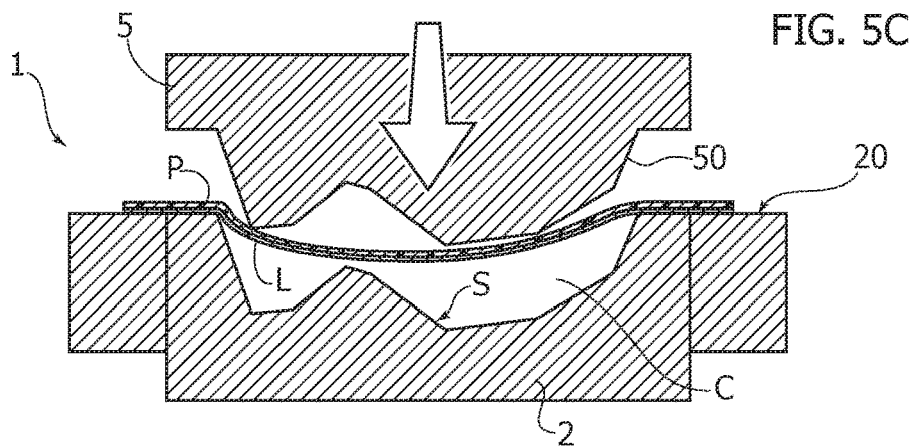
Figure 5D:
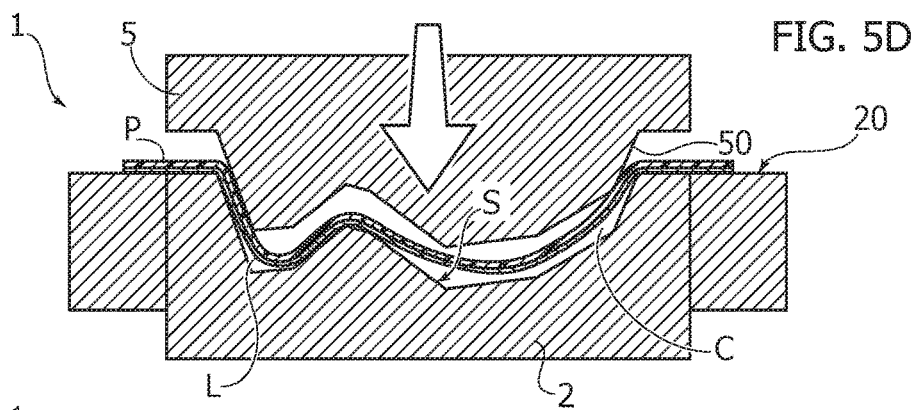
Figure 5E:
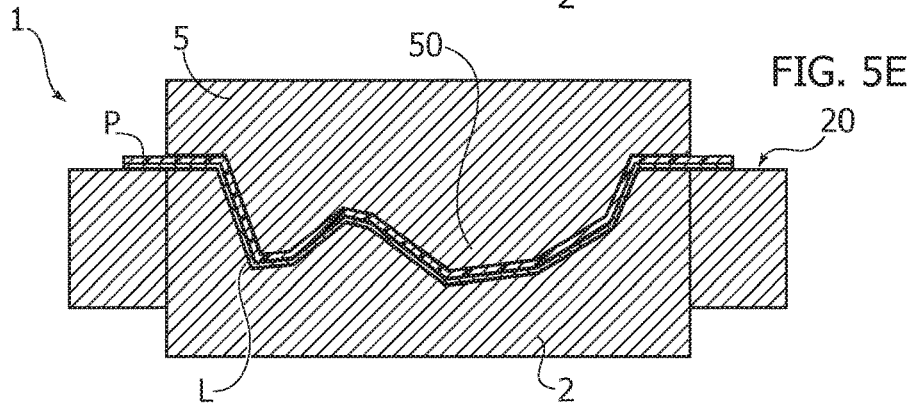
Figure 5F:
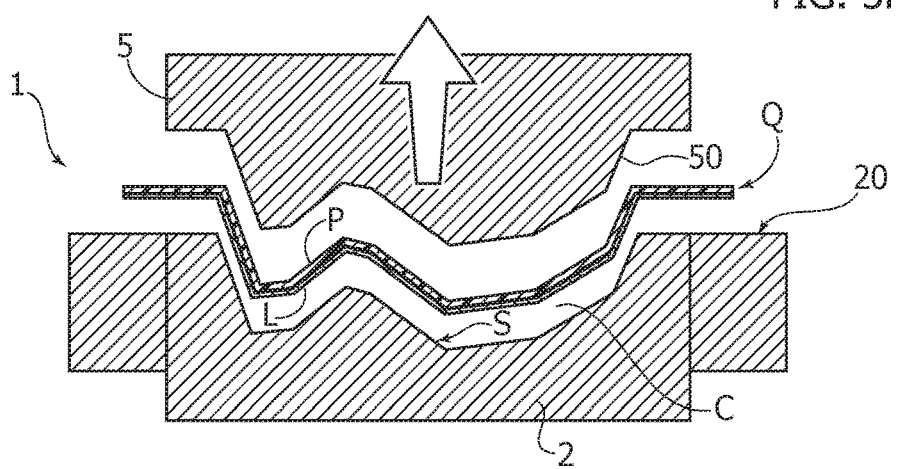

Further features and advantages of the invention will became readily apparent from the description which follows with reference to the annexed drawings, given purely by way of non-limiting example, in which:

FIGS. 1A, 1B are exploded diagrammatic views of different configurations of a hybrid panel which are provided for carrying out the method of the invention, FIGS. 2A-2F show different steps of a first embodiment of the method according to the invention, FIG. 3 is a diagrammatic exploded view of a further configuration of a hybrid panel provided for carrying out the method of the invention, FIGS. 4A-4C show the subsequent steps of a further embodiment of the method according to the invention, and FIGS. 5A-5F show the various steps of a further embodiment of the method according to the invention.

With reference to FIG. 1A, the method according to the invention may be applied for example to a blank constituted by a sheet element of light alloy L, such as magnesium alloy or aluminium alloy, and a sheet of plastic material P.

As shown in FIG. 1, both elements L, P are substantially planar.

They are coupled with each other so as to be in contact substantially along their entire extension, in a loose condition, i.e. without any preliminary mutual connection. In the preferred embodiment, the plastic material constituting the sheet P is a composite material comprising a matrix of plastic resin, such as polypropylene or polyamide and reinforcing fibres, such as carbon fibres or glass fibres. The blank constituted by the two elements P, L in contact with each other is preliminarily arranged within a mould structure 1 comprising a first mould element 2 having an upper surface 20 in which a mould cavity C is formed defining a forming surface S. The two elements P, L in contact with each other are applied above the upper surface 20 of the mould element 2 and pressed thereon at the peripheral portions by means of a closing element 3 (FIG. 2B). The first mould element 2 and the closing element 3 are pressed against each other with a predetermined and controlled force.

The entire process is carried out with simultaneous application of heat, such as by using heated mould elements and if required by providing also a preliminary step of heating the elements P, L before they are introduced within structure 1.

In the annexed drawings, the details of construction of the forming elements and the devices provided for moving these elements between the opened condition shown in FIG. 2A and the closed condition shown in FIG. 2B, as well as the devices which are for applying the required pressure in order to press the closing element 3 above the mould element 2, are not illustrated, since they can be made in any known way and since they do not fall, taken alone, within the scope of the present invention. The deletion of these details from the drawings also renders the latter simpler and easier to understand.

With reference also to FIGS. 2A-2F, the covering element 3 has at least one passage 30 which is used for supplying gas under pressure against the blank constituted by the two elements P, L in contact with each other. The guess may be nitrogen or argon. The supply pressure may vary between 10 bar and 200 bar, depending upon the applications. The temperature at which the method described herein is carried out may vary between 150° C. and 350° C., preferably between 150° C. and 200° C., also in this case depending upon the applications and the characteristics of the materials constituting the elements P, L.

The gas under pressure supplied through passage 30 causes a progressive deformation of the hybrid panel constituted by the elements P, L of plastic material and light alloy until it is caused to adhere against the forming surface S so as to assume the corresponding shape. The duration of the process may arrive to be in the order of 2-3 minutes.

In case the plastic material is a composite plastic material reinforced with fibres, curing of the resin matrix is obtained during the forming process.

Once forming is obtained, the closing element 3 is raised for enabling the hybrid panel Q to be removed from the mould structure. An important feature of the present invention lies in that preliminarily to the forming step, the surface of the sheet element of light alloy L which is to come in contact with the sheet of plastic material P is subjected to a roughening process (such as by sand-blasting, by chemical etching or by laser processing) in order to enable adhesion of the plastic material to the sheet metal following softening of the plastic material which takes place during the hot pressing, for which the plastic material fills the gaps between the asperities of the surface of the element of light alloy.

In the example of FIGS. 2A, 2F a single sheet element L and a single sheet of plastic material P are provided, arranged with the sheet metal element L facing towards the forming surface S, so that on the opposite side the sheet of plastic material may be provided with additional layers P1, P2 localized at portions of the panel which require to be reinforced, according to what is illustrated in FIG. 1B.

The same process shown in FIGS. 2A-2F can be carried out of course by inverting the position of the two elements P, L, i.e. by arranging the element of plastic material P in direct contact with the forming surface. Yet according to a further alternative, it is possible to provide a blank of the type shown in FIG. 3, constituted by a sheet of plastic material P, interposed between two sheet elements of light alloy L1, L2.

FIGS. 4A-4C show an alternative embodiment in which the forming surface S is a projecting surface defined by a first mould element 2.

In this case the hybrid panel Q constituted for example as shown in FIG. 1A or 1B or 3 is clamped between peripheral portions of a vertically movable frame 4 which is lowered with a force F above the first mould element 2. Between frame 4 and the hybrid panel Q a cavity D is defined which is supplied with gas under pressure through a passage 40 formed through the frame 4. Once the hybrid panel Q has been clamped within frame 4, gas under pressure is supplied within chamber D (FIG. 4B) while frame 4 is lowered above the mould element 2 with the projecting forming surface S (FIG. 4C) until the hybrid panel Q is pressed in contact against the entire projecting surface S, so as to be formed in the desired manner.

FIGS. 5A-5F show a method very similar to that of FIGS. 2A-2F with the only difference that in this case the hybrid panel is pressed against the forming surface S of the first mould element 2 not by gas under pressure, but rather by means of a second mould element 5 having a lower surface 50 with a similar shape to that of the forming surface S of the first mould element 2.

As readily apparent from the foregoing description, the method according to the invention enables hybrid structures having multi-layered walls of light alloy and plastic material to be obtained in a simple and efficient manner.

The method may be used advantageously for example for providing components of motor-vehicle structures, such as portions of motor-vehicle floor panel.

Naturally, while the principle of the invention remains the same, the details of construction and the embodiments may widely vary with respect to what has been described and illustrated purely by way of example, without departing from the scope of the present invention.

What is claimed is:

1. A method for obtaining a component of a motor-vehicle structure by a hot pressing operation on at least one sheet element of light alloy, said method comprising the steps of:
    performing a roughening treatment on a surface of said at least one sheet element of light alloy which is to come in contact with at least one sheet of plastic material, so as to define surface asperities,
    positioning the at least one sheet element of light alloy and the at least one sheet of plastic material in contact with each other substantially along their entire extension, in a loose condition, without any further mutual connection, thereby providing a hybrid panel;
    positioning the hybrid panel adjacent to a mould element having a forming surface,
    hot forming said hybrid panel in its entirety by pressing it against said forming surface of said mould element with a predetermined controlled pressure and by simultaneously applying heat, until the hybrid panel assumes a configuration corresponding to that of said forming surface,
    wherein said at least one sheet element of light alloy and said at least one sheet of plastic material constituting the hybrid panel are caused to adhere to each other following softening by heat of the at least one sheet of plastic material during said hot forming step, with the plastic material of the at least one sheet of plastic material which enters into said asperities when it is softened by heat during said hot forming step.

2. The method according to claim 1, wherein said hot forming step is made by pressing the hybrid panel against said forming surface by a gas under pressure.

3. The method according to claim 1, wherein said hot forming step of the hybrid panel is made by pressing the hybrid panel against said forming surface of the mould element by a second mould element.

4. The method according to claim 1, wherein:
    said mould element comprises a cavity defining said forming surface,
    wherein said hybrid panel is applied above said mould element so as to be in contact with lateral portions of said mould element so as to overlie said cavity and, in this condition, a closing element is applied above said hybrid panel, so as to press peripheral portions of the hybrid panel against said lateral portions of the mould element, and
    said closing element has a passage through which fluid under pressure is supplied, so as to push the hybrid panel against the forming surface of said cavity.

5. The method according to claim 1, wherein said mould element defines a projecting forming surface and the hybrid panel is clamped along its periphery within a vertically movable frame which is lowered above said projecting forming surface, and
    wherein between the vertically movable frame and the hybrid panel clamped thereto, a chamber is defined in which fluid under pressure is supplied for pressing the hybrid panel against said forming surface.

6. The method according to claim 1, wherein the at least one sheet element of light alloy and the at least one sheet of plastic material include a single sheet element of light alloy and a single sheet of plastic material.

7. The method according to claim 1, wherein the at least one sheet element of light alloy and the at least one sheet of plastic material include a sheet of plastic material interposed between.

8. The method according to claim 1, wherein the plastic material of the at least one sheet of plastic material is a composite material having a matrix of plastic resin and reinforcing fibres.

9. The method according to claim 1, wherein the hot forming operation is carried out at a temperature between 150° C. and 350° C.

10. The method according to claim 3, wherein the gas under pressure is supplied at a pressure between 10 bars and 200 bars through a time not greater than two minutes.

11. The method according to claim 1, wherein said at least one sheet element of light alloy has a thickness between 0.1 mm and 2 mm.

12. The method according to claim 1, wherein the at least one sheet element of light alloy and the at least one sheet of plastic material include a single sheet element of light alloy and a single sheet of plastic material, arranged with the sheet element of light alloy facing towards the forming surface, so that on an opposite side the sheet of plastic material there is provided additional layers of plastic material localized at portions of the hybrid panel which require to be strengthened.

13. The method according to claim 8, where the plastic resin includes polypropylene or polyamide and the reinforcing fibres include carbon fibres or glass fibres.

14. The method according to claim 9, wherein the hot forming operation is carried out at a temperature between 150° C. and 250° C.

* * * * *